US008751668B2

(12) United States Patent
Kulkarni et al.

(10) Patent No.: US 8,751,668 B2
(45) Date of Patent: Jun. 10, 2014

(54) DECENTRALIZED MULTI-USER ONLINE ENVIRONMENT

(75) Inventors: Santosh Kulkarni, Glen Waverley (AU); Aaron Harwood, Coburg (AU); Egemen Tanin, Hawthorn East (AU); Scott Douglas, North Fitzroy (AU)

(73) Assignee: National ICT Australia Limited, Eveleigh, New South Wales (AU)

(*) Notice: Subject to any disclaimer, the term of this patent is extended or adjusted under 35 U.S.C. 154(b) by 1396 days.

(21) Appl. No.: 12/444,094

(22) PCT Filed: Oct. 5, 2007

(86) PCT No.: PCT/AU2007/001512
§ 371 (c)(1),
(2), (4) Date: Jan. 21, 2010

(87) PCT Pub. No.: WO2008/040092
PCT Pub. Date: Apr. 10, 2008

(65) Prior Publication Data
US 2010/0146128 A1    Jun. 10, 2010

(30) Foreign Application Priority Data
Oct. 5, 2006    (AU) ............................... 2006905510

(51) Int. Cl.
*G06F 15/16*    (2006.01)
*G06F 15/173*    (2006.01)

(52) U.S. Cl.
USPC ......................................... 709/228; 709/225

(58) Field of Classification Search
USPC .......... 709/225; 370/223, 234, 235, 238, 254, 370/351, 468, 464, 230
See application file for complete search history.

(56) References Cited

U.S. PATENT DOCUMENTS

| 6,767,287 | B1 | 7/2004 | Mcquaid et al. |
| 2003/0008712 | A1 | 1/2003 | Poulin |
| 2003/0177187 | A1 | 9/2003 | Levine et al. |
| 2004/0044727 | A1 | 3/2004 | Abdelaziz et al. |
| 2004/0107245 | A1 | 6/2004 | Bodnar |

(Continued)

FOREIGN PATENT DOCUMENTS

| FR | 2861863 | 5/2005 |
| JP | 2006-195694 | 7/2006 |

OTHER PUBLICATIONS

Big World Technologies; website http://www.bigworldtech.com/licensing/bigworld_brochure_med_res.pdf; accessed Aug. 25, 2006; 16 pages.

(Continued)

*Primary Examiner* — John Follansbee
*Assistant Examiner* — Alan S Chou

(57) ABSTRACT

Protocols for facilitating a peer-to-peer real time network in which network state information and data processing is delegated to user nodes. A virtual space is recursively divided into a plurality of sub-regions represented by a logical tree, with responsibility for leaf nodes delegated to multiple user nodes. A distributed hash table can be used to store leaf node state and identity information. A discovery index protocol is provided for user nodes to effectively identify a user node responsible for a sub-region of interest. Further, a semantic filtering protocol limits communications primarily to other user nodes deemed relevant, so as to constrain bandwidth usage. A broadcast control protocol is provided to increase the number of simultaneous interactions for each user node. A security protocol is also provided to prevent any illegal activity by malicious nodes.

8 Claims, 5 Drawing Sheets

(56) References Cited

U.S. PATENT DOCUMENTS

| | | |
|---|---|---|
| 2005/0071481 A1 | 3/2005 | Daniell |
| 2005/0187946 A1 | 8/2005 | Zhang et al. |
| 2005/0216559 A1 | 9/2005 | Manion et al. |
| 2005/0223102 A1 | 10/2005 | Zhang et al. |
| 2006/0039297 A1 | 2/2006 | McNab |

OTHER PUBLICATIONS

Sun Microsystems; Windysoft Sun Delivers Optimized Gaming Platform; website http://ww.sun.com/x64/docs/WindysoftFinal.pdf#search=%22sun%20gaming%20platform%22; accessed Aug. 25, 2006; 4 pages.

Solipsis; website http://solipsis.netofpeers.net/wiki2/index.php/Main_Page; accessed Aug. 25, 2006; 1 page.

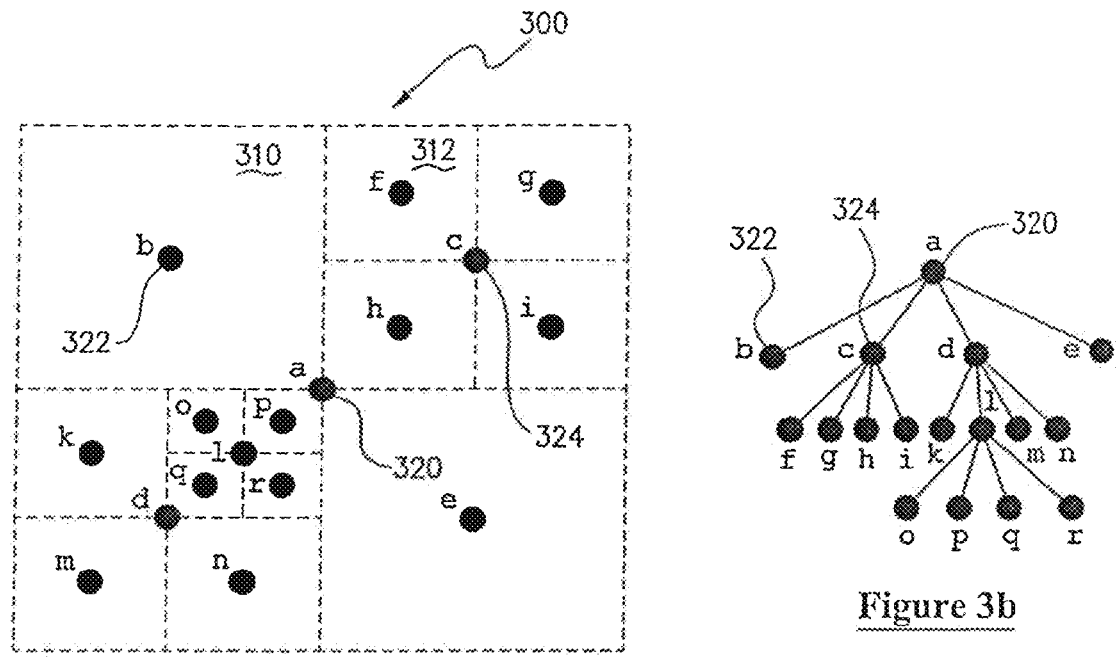
Figure 3a
Figure 3b
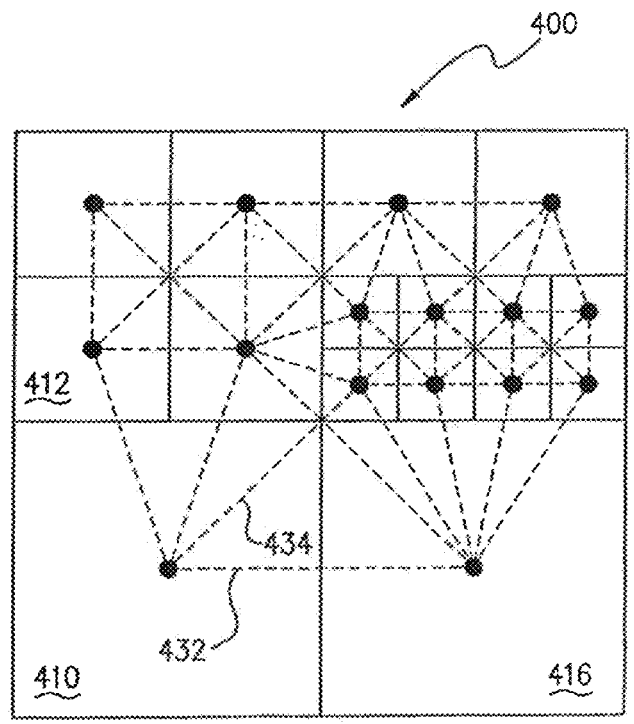
Figure 4

DECENTRALIZED MULTI-USER ONLINE ENVIRONMENT

CROSS-REFERENCE TO RELATED APPLICATIONS

The present application claims priority from Australian Provisional Patent Application No 2006905510 filed on 5 Oct. 2006, the content of which is incorporated herein by reference.

TECHNICAL FIELD

The present invention relates to information networks such as the Internet, and in particular relates to the provision of a multi-user network, such as an online gaming environment, in a manner which is scalable to a large number of users.

BACKGROUND OF THE INVENTION

Multi-user networks may be required for a range of reasons. Among the most resource intensive of such multi-user networks are multi-user online gaming environments. Online gaming environments increasingly involve a complex and large virtual environment which is desired to be portrayed or rendered in as much detail as possible, in as close to real time as possible, in order to provide users or game players with a more realistic gaming experience. Further, an ever increasing number of users wish to participate together within such a gaming environment. Thus, large data volumes, high data rates and high data complexity is generally required in order to manage large numbers of users participating in real time in a spatially complex and highly detailed virtual environment.

A game publisher desiring to deploy an online gaming environment generally must establish a central game server with sufficient resources to handle game sessions for many hundreds or thousands of participants. Servers with sufficient processing power to function in this manner are expensive, leading to high deployment costs for game publishers. One proposal is to provide a server farm, upon which multiple game developers may centrally host their games, which can reduce deployment costs to a certain extent. However, any system utilising central gaming servers involves substantial expense associated with the gaming servers.

A further problem with gaming systems relying on central gaming servers is that the central gaming server presents a single point of failure. Consequently, any power failure, server failure or network connection failure or deterioration at the central gaming server can cause the entire gaming environment to deteriorate or fail.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect the present invention provides a protocol for facilitating a peer-to-peer real time network in which network state information and data processing is delegated to user nodes, the protocol comprising:

each node determining a subset of network nodes deemed relevant to that node and limiting communications to that subset;

each node undertaking semantic filtering to limit communications with another node to data types relevant to that other node; and each node determining, for each node of the subset, a broadcast protocol which optimises communications to that node.

According to a second aspect the present invention provides, for a peer-to-peer real time network in which network state information and data processing is delegated to user nodes, a discovery index protocol for a first node to determine a subset of nodes deemed relevant to the first node, the discovery index protocol comprising:

assigning responsibility for sub-regions of a virtual space of the network to selected coordinating peer nodes, each coordinating peer node being responsible for communicating network state updates to nodes active within the respective sub-region, and for receiving network state updates from nodes active within the respective sub-region;

each node maintaining a network state update connection with a plurality of coordinating peer nodes; and maintaining a discovery index which records network state update connections of the nodes.

In preferred embodiments of the second aspect of the invention, in a network having n participating nodes, each node preferably maintains network state update connections with substantially $\log(n)$ coordinating peer nodes.

In preferred embodiments of the second aspect of the invention, the discovery index performs at least one of:

recording a sub-region of the virtual space of the network in which an entity is currently present;

recording insertions, deletions and modifications of virtual objects and entities within each sub-region advising a requesting node of entities proximal to the node in the requesting node's sub-region, with which the requesting node may establish direct connections.

The sub-regions are preferably determined by recursively subdividing the virtual space into a logical tree, such as a quad tree. Preferably, virtual objects are associated with control points only at a non-root level of the quad tree, so as to avoid a single point of failure at the root level of the quad tree. For example, the root level and level 1 control points may be prevented from having any virtual object associated with them.

The discovery index is preferably a distributed discovery index, collectively maintained by and distributed across a plurality of nodes of the network. Preferably, the distributed discovery index is effected by a distributed hash table (DHT). In such embodiments, each node hosting the DHT is preferably operable to undertake queries to locate and retrieve virtual spatial objects from the DHT. Preferably, the DHT stores records of all nodes of a logical tree into which the virtual space has been recursively divided. In particularly preferred embodiments node data, such as leaf node identity and leaf node host IP address, is aggressively cached by each host in order to minimise a number of lookup operations required of the DHT and increase the likelihood that the host that stores a particular leaf node can be identified in a single operation. In particular such embodiments, the node data may be cached with a probability that is inversely proportional to the virtual distance from the originating leaf node.

According to a third aspect the present invention provides, for a peer-to-peer real time network in which network state information and data processing is delegated to user nodes, a semantic filter protocol for limiting communications of a filtering node with each of a plurality of related nodes to data types relevant to each such related node, the semantic filtering protocol comprising:

determining whether a virtual entity of each other node is concealed from the filtering node in a virtual space of the network, and preventing communications with related nodes having concealed virtual entities;

assigning to each unconcealed related node a relevance level indicating the relevance of that unconcealed related node to the filtering node; and constraining communications of the filtering node with each unconcealed related node by an amount corresponding to the relevance level.

In preferred embodiments of the third aspect of the present invention, the determination of whether a related node is concealed may be made by reference to whether a virtual line of sight exists in the virtual space between the filtering node and the related node.

In preferred embodiments of the third aspect of the present invention, the constraining of communication comprises at least one of limiting a packet size of packets with which the filtering node communicates with the unconcealed related node; and, limiting an update frequency at which updates are communicated between the filtering node and the unconcealed related node.

In preferred embodiments of the third aspect of the present invention, the relevance level corresponds to a virtual distance between virtual entities of two respective nodes.

In preferred embodiments of the third aspect of the invention, the related nodes of the filtering node are determined by the discovery index protocol of the second aspect of the invention.

According to a fourth aspect the present invention provides, for a peer-to-peer real time network in which network state information and data processing is delegated to user nodes, a broadcast control protocol for optimising packet transfer between a first node and a plurality of related nodes, the broadcast control protocol comprising:

assigning to each related node a relevance level i being selected from k relevance levels, indicating the relevance of that related node to the first node;

associating with each relevance level i a number of nodes $n_i$, an update message size $m_i$ and an update frequency $a_i$;

determining from an available upstream bandwidth U of the first node a number of levels $c_j$ in a broadcast tree of the first node by reference to $$U = \Sigma_{i=1}^{k} c_i \cdot \text{sqrt}(n_i) \cdot m_i \cdot a_i, \text{ wherein } 0 < c_i < \text{sqrt}(n_i)$$

In preferred embodiments of the fourth aspect of the present invention, the highest satisfying value of $c_i$ is selected. In further preferred embodiments, higher levels of the broadcast tree are given priority over lower levels such that $c_1 > c_2 > c_3 \ldots > c_n$.

Preferred embodiments of the fourth aspect of the present invention form the broadcast tree by allocating each related node to a level of the broadcast tree based on at least one of the parameters of: upstream bandwidth of the related node, stability history, network distance and ping time statistics. Each such parameter may be allocated a weight representing relative importance.

According to a fifth aspect the present invention provides, for a peer-to-peer real time network in which network state information and data processing is delegated to user nodes, a security protocol for resisting malicious activity, the security protocol comprising:

a first node communicating with a plurality of related nodes by selecting a first subset of the related nodes, and forwarding an encrypted communication to the first subset of x nodes, the encrypted communication including instructions to forward the communication;

the first subset of nodes each forwarding the communication, such that the communication is forwarded to x subsets of related nodes.

In preferred embodiments of the fifth aspect of the present invention, each node holds a list of all related nodes, and each receiving node forwards the communication only to nodes which did not receive the communication with the receiving node.

In preferred embodiments of the fifth aspect of the present invention, where there exists n related nodes, x is preferably determined to be C·sqrt(n), where C is a tunable constant.

In preferred embodiments of the fifth aspect of the present invention, the subsets of related nodes are selected randomly for each new communication, such that a distribution tree formed by the layered broadcast throughout the related nodes varies randomly from one communication to the next.

In preferred embodiments of the fifth aspect of the present invention, a communicating node assigns a weight to each related node for load balancing, the weight being based upon at least one of: network distance, ping time, upstream capacity, current load, and stability history.

According to a sixth aspect the present invention provides a system comprised of multiple nodes operating in accordance with the protocol of at least one of the first to fifth aspects of the present invention.

According to a seventh aspect the present invention provides a user software application for implementing the protocol of at least one of the first to fifth aspects of the present invention.

According to an eighth aspect the present invention provides a game development platform software application for enabling game developers to design games or online environments which comply with the protocol of at least one of the first to fifth aspects of the present invention.

According to a ninth aspect the present invention provides a device operating in accordance with the protocol of at least one of the first to fifth aspects of the present invention.

In preferred embodiments of the first to ninth aspects of the present invention, the peer-to-peer real time network is for massively multi-user online entertainment.

BRIEF DESCRIPTION OF THE DRAWINGS

An example of the invention will now be described with reference to the accompanying drawings, in which:

FIG. 3 illustrates a region based quad tree for deriving related subsets of nodes from a plurality of nodes;

FIG. 4 illustrates connections between neighboring leaf regions of a subdivided spatial region;

DESCRIPTION OF THE PREFERRED EMBODIMENTS

Figure 1:
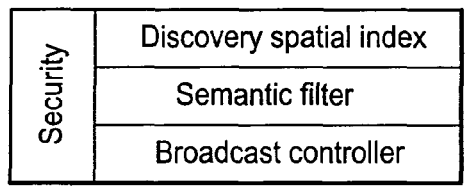
FIG. 1 illustrates a protocol stack for the technology modules in accordance with a first aspect of the invention.
Figure 2:
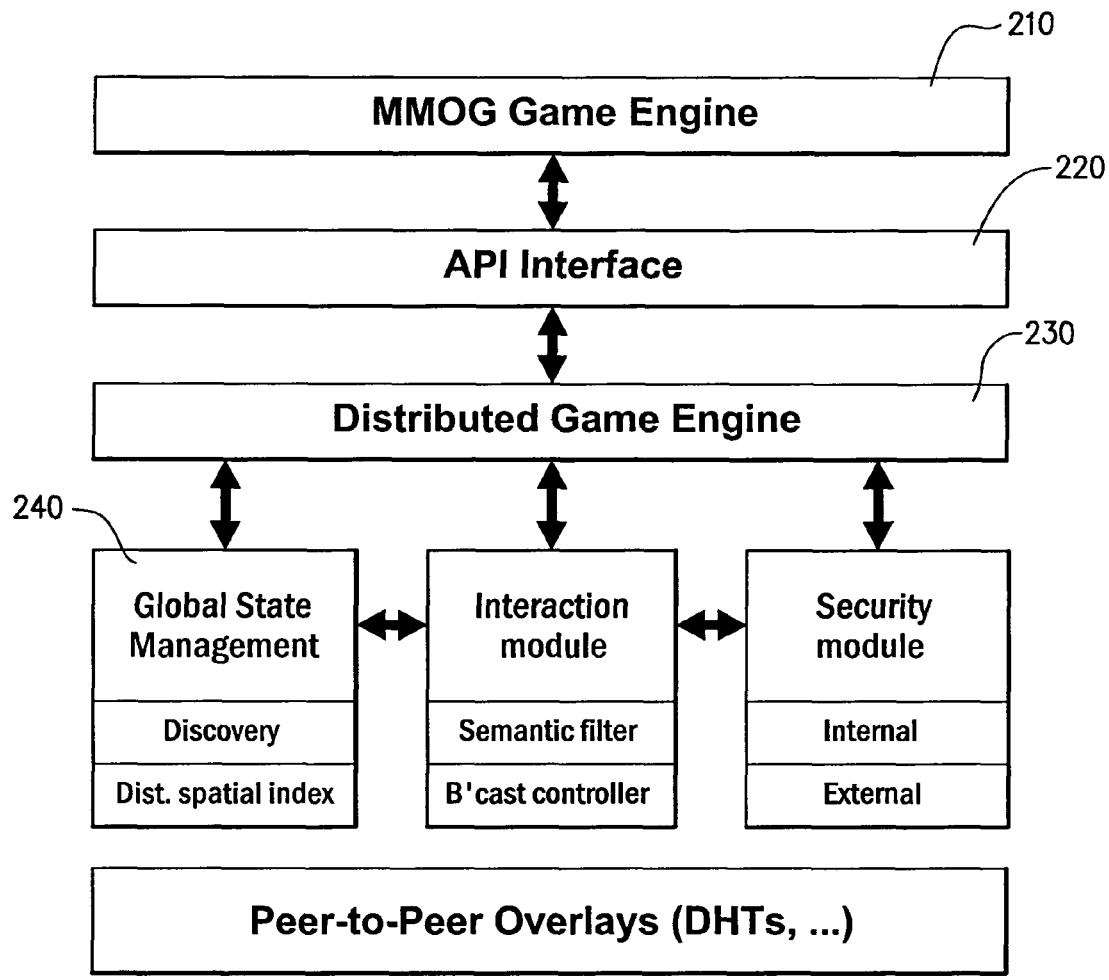
FIG. 2 illustrates a massively multi-player online gaming engine architecture in accordance with the present invention.

One example of a technical architecture of a massively multi-player online games (MMOG) platform will now be described with reference to FIGS. 1 to 4 which illustrate the components of the protocol architecture. Referring to FIG. 2, the MMOG game engine 210 is provided by the game developers and includes the game logic, the content for the different worlds/environments, the graphical interface, the character definition and all the game rules as defined by the game studios. This module 210 will interface with the MMOG platform through a set of application programmer interfaces (APIs) 220.

The application programmer interface 220 provides a logical abstraction of the networking subsystem by defining its generic functionality. Its fundamental purpose is to simplify the use of the network layer by game developers with a minimal but flexible set of operations. The identification of this set defines the application requirements of the networking subsystem, facilitating its use in many different MMOGs.

The distributed game engine (DGE) 230 is a collection of distributed algorithms (protocols) that access and manipulate shared game data and processes, by interacting with other logical modules. The distributed game engine includes a non-transitory machine-readable medium that contains the distributed algorithms, protocol instructions. The machine-readable medium includes any mechanism that provides (i.e. stores and/or transmits) information in a form readable by a machine (e.g. a computer). For example, a machine-readable medium includes read only memory (ROM), random access memory (RAM), magnetic disk storage media, optical storage media, flash memory device, and electronic, optical, acoustical or other form of signal storage. The dissemination and aggregation of game state in a client server application consists of a simple two party communication. The same operations in a distributed module must communicate with many peers. Typically these operations can be classified into a few reoccurring patterns. The DGE 230 is responsible for identifying and executing the most appropriate algorithm for a given operation. Communication patterns range from high frequency updates, such as player virtual position, to one off operations with high reliability such as virtual money transactions.

In addition the allocation of tasks for various parts of game upkeep must also be provided. These include not only running characters and animated objects but also constraint and condition assertions, processing of security information, garbage collection, and the like. Examples of operations are:

Finding the nearest player.
Finding the total amount of gold in the game.
Save/modify the state of a quest.
Execute the AI of a NPC.
Ensure that a resource replenishes itself.
Collect game statistics.
Allocate the processing of security audits.

The game engine 230 will need to store many types of data, each requiring an efficient index/database. The game state management (GSM) 240 will be responsible for this data and provide a range of distributed operations to manipulate it. In the simplest case it may be a distributed file system, in other cases it may require temporal indexing, concurrency/transactions, etc. Examples of global state include:

Files—maps, textures, models, code.
Game state—money, score, character details, resources, etc.
Security information—suspicious peers, auditing data, authentication, etc.
Transient but global state—doors, seasons, transport times, etc.
Spatial data—entity regions, maps (towns, buildings, etc), nearest neighbour etc.

Each category of data has different performance/accuracy requirements, and the present embodiment recognises the suitability of specific solutions rather than a single global distributed database. GSM 240 includes efficient entity maintenance and interaction in the context of a P2P network. The challenge is to dynamically organise the network in a way that provides an efficient communication mechanism between many interested players. MMOGs often host thousands of participants at any one time, therefore the present invention provides for communication to only occur between a subset of distributed entities. The present embodiment recognises that the performance of the game is dependent on successfully and efficiently determining a suitable subset of players from a global set of participants.

Neighbour based schemes for selecting suitable subsets of players may be used in embodiments of the invention, and use Euclidean distance within the virtual world as a heuristic to form connections. These schemes have a communication and computational overhead since each entity must check the distance between each disconnected pair of neighbours and inform them of new connections each time an entity moves.

In alternative embodiments of the invention, region based schemes may be used, which assign a region of the virtual space to a coordinating peer. This peer is responsible for propagating updates to all entities within it's region, and similarly, all entities within the region must send their updates to the coordinating peer. These schemes may use a quad tree to break the regions to a smaller size so that a coordinating peer doesn't have to coordinate updates for a large number of nodes. FIG. 3 shows a typical quad tree. An event region 300 is sub-divided further into smaller event regions 310, 312, etc, depending on the number of entities in the region. All the nodes 322, 324, etc have a connection established with the root node 320, which is the node coordinator of the larger event region 300. If a peer wants to contact the coordinating node, say node 322, for a given event, it will contact the root node 320 and traverse the tree illustrated in FIG. 3b until it reaches the appropriate coordinating peer 322.

The present embodiment recognises that a drawback with the preceding coordinating peer approach is that all the peers have to traverse via the root node 320 or coordinating peer. This root node 320 becomes a bottleneck for the rest of the nodes. If there are a large number of nodes in the network, it can slow the entire process of entity discovery given that the coordinating root node 320 has fixed resources.

Accordingly, in the present embodiment each peer maintains log(n) connections instead of just one connection to the root node 320. The nodes therefore maintain a connection not only to the root node 320 but to other coordinating nodes 322, 324, etc. Hence, the present embodiment decouples the process of querying a region of the virtual region 300 (along with global entity maintenance) from interaction management between entities (eg. a set of players in a virtual room). This distributed spatial index, referred to as the spatial data service (SDS), provides a means to insert, delete, query, and modify objects in a multidimensional space. Entities register an event region, a region of space which is guaranteed to contain the entity for some time, with SDS. Entities can query SDS to find nearby objects with which direct connections can be formed. This performs effective interest management by minimising the number of connections, removing routing delays, avoiding reliance on introduction by neighbouring peers to form new connections and uses little CPU resources to maintain potential neighbours.

Global connectivity and query facility between all the entities is thus maintained without a need for frequent updates on the index. The interacting entities communicate with each other frequently while they send summary updates to the SDS about their positions when needed. As this approach removes the bottleneck by avoiding the root node 320, it is very efficient and involves fewer traverses to reach a particular coordinating peer. This makes the entity discovery process very efficient.

The spatial indexing algorithm employed in one preferred embodiment is now described in more detail. FIG. 4 illustrates connections between neighbouring leaf regions 410, 412, 416, etc of a subdivided spatial region 400. The connections are shown as dashed lines 432, 434, etc. Note that diagonally neighbouring regions are considered to be connected as shown by 434. Connections are considered as load, so for the lower right region 416, if the number of connections increased the load to an unacceptable level then the region 416 would be subdivided. Spatial objects within the spatial region 400 are not shown in FIG. 4, nor are additional cached connections between non-neighbours shown.

The algorithm of this embodiment provides efficient decentralized indexing and querying of spatial objects, describes how an arbitrary number of hosts such as desktop computers can collectively maintain a spatial index of spatial objects, and describes how those hosts can undertake queries to locate and process spatial objects. The algorithm uses a combination of recursive subdivision of space, a distributed hash table and aggressive caching.

The index and queries are processed in a decentralized way, where decentralized is a term that implies that the failure of any host has, on average, no worse impact on the features or the performance of the algorithm than the failure of any other host. Each host has an Internet Protocol Address, known as the IP address of the host.

The present algorithm uses a distributed hash table (DHT). The DHT should be deterministic and consistent, and suitable examples include Chord, Kademlia and Accordion. The operations provided by the DHT are assumed to be join, leave and lookup. The lookup operation can be used in the form of key-based routing. The DHT is also assumed to provide reliable storage, in the sense of replications of stored objects.

The algorithm of the present embodiment dynamically subdivides space such as space 400 into a logical tree such that only leaf nodes of the tree are used to store spatial objects. All nodes of the tree are stored in the DHT. Aggressive caching is used by hosts to cache (leaf node, IP address) pairs. These cached entries are distinct from any caching done by the DHT. The cached entries are stored both in leaf nodes and independently by hosts (in the case where a host does not store any leaf nodes). Where possible, this caching eliminates the DHT lookup operation so that the host that stores a leaf node (which corresponds to a used region of space) can be identified in a single operation. The (leaf node, IP address) pairs are cached with a probability that is inversely proportional to the distance from the originating leaf node (the leaf node that the querying peer identified as the starting location for a query).

The algorithm is now described in more detail in terms of a join operation, a lookup operation, update operation and a leave operation.

Figure 5:
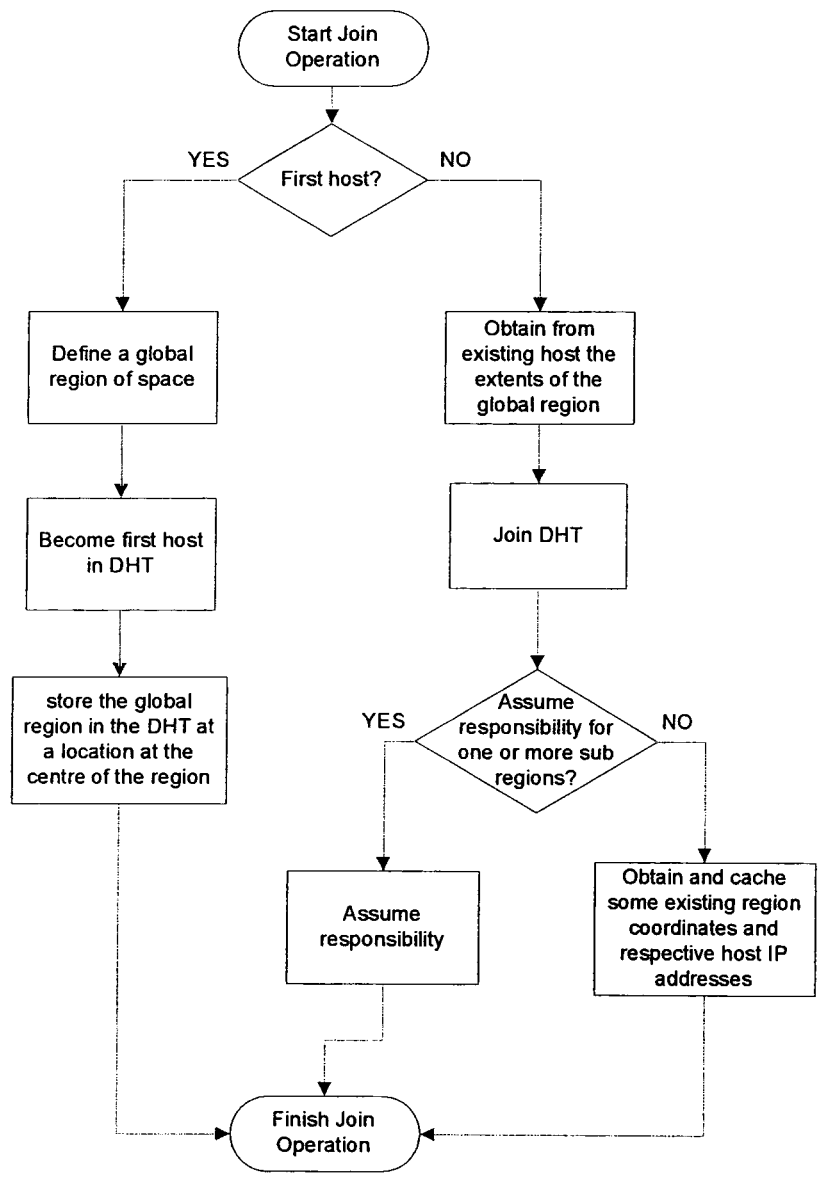
FIG. 5 is a flowchart of a joint operation.

The join operation is illustrated in FIG. 5 and comprises the following. Step 1. A host either contacts an existing host in the system or becomes the first host to join. In the case of contacting an existing host, go to Step 6, otherwise continue with Step 2. Step 2. The first host to join defines a global region of space. For the purpose of this description we consider a two dimensional space. The region initially has no spatial objects in it and the region has no neighbouring or cached regions. Step 3. The first host becomes the first host in the DHT. Step 4. The first host forms the byte string "R(X,Y)" where X and Y are numbers that are the centre of the global region, and stores the global region in the DHT at the key "R(X,Y)". Step 5. The join operation for the first host is complete. Stop here.

Step 6. A subsequent host, called the joining host, contacts an existing host. The existing host communicates to the joining host the extents of the global region. Step 7. The joining host joins the DHT. As a result the joining host may or may not assume responsibility for some number of regions according to the rules of the DHT. Step 8. If the joining host does not assume responsibility for any regions (e.g. this could happen when the existing number of regions is smaller than the total number of hosts) then the existing host communicates some number of "R(X,Y)" coordinates of existing regions and the current IP addresses of the respective hosts which store the associated region information. The joining host stores the region coordinates and IP addresses in its cache. Step 9. Joining is complete. Stop here.

Figure 6:
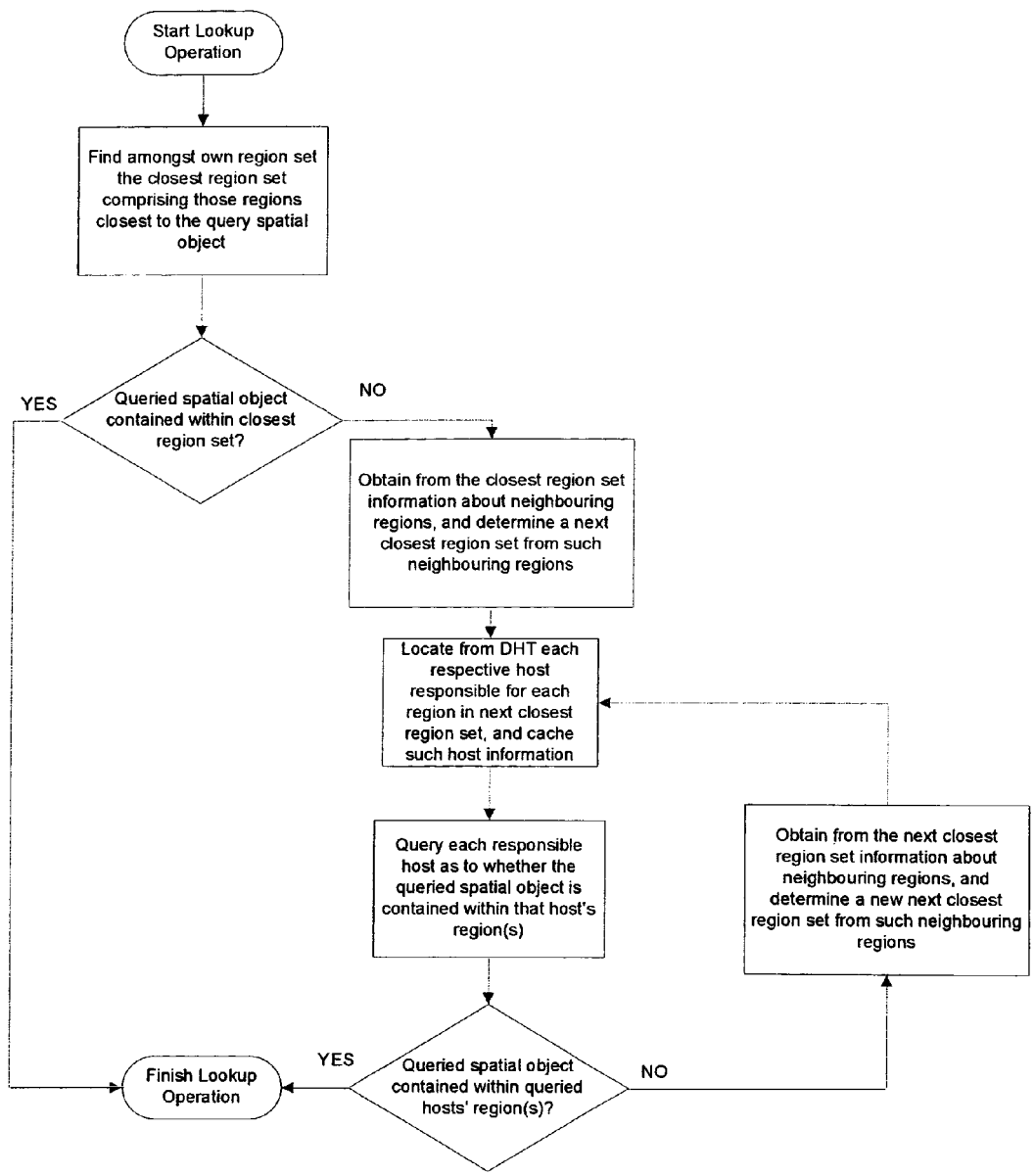
FIG. 6 is a flowchart of a lookup operation.

The lookup operation is illustrated in FIG. 6. It is an invariant that, as a consequence of the algorithm, the system ensures that at all times, each host will either have responsibility for some regions (which themselves may contain cached region information) or will have some region coordinates stored in its cache, or both. All of these regions are collectively referred to as the host's region set.

Step 1. The lookup for an arbitrary point (x,y) or spatial object proceeds using a greedy routing algorithm. The host initiating the query first finds, among its region set the regions that are closest to the query spatial object. These are collectively called the closest region set. Step 2. If the found region (s) contain the query then the lookup procedure is complete. Stop here.

Step 3. The host computes, using the information stored in each closest region about the region's neighbouring regions, which of those regions are closest, those regions become the next closest region set. Step 4. For each region in the closest region set the host uses the DHT to locate the responsible host by forming the appropriate "R(X,Y)" byte strings for each region. The host caches this information either in the closest regions themselves (if they are owned by the host) or separately for future use.

Step 5. The host sends the query to the responsible hosts just found. The process iteratively continues (see Note 9), greedily routing the query towards the target regions and simultaneously towards the hosts responsible for those regions. The host initiating the query collects and caches the region coordinates and IP addresses for the regions along the path. The caching policy is as described in the introduction to this method.

Figure 7:
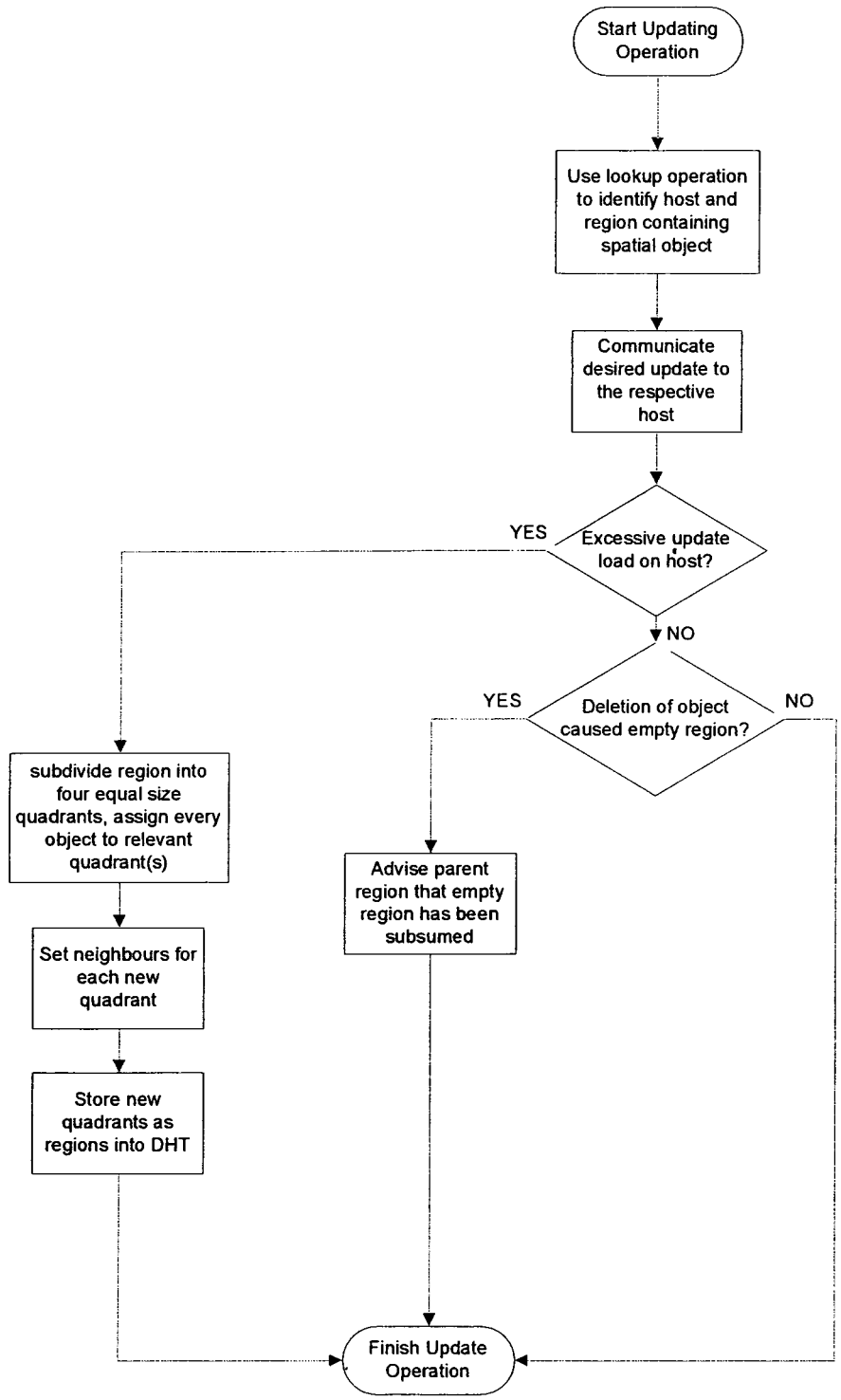
FIG. 7 is a flowchart of an updating operation.

The updating operation is illustrated in FIG. 7. An update includes storing an object, deleting an object and modifying an object. Step 1. Use the lookup operation to locate the region(s) and responsible host(s) which contains the spatial object. A spatial object which spans across a subdivision line is broken into two or more objects as required. Step 2. Communicate the update operation to the responsible host. Step 3. If the number of objects stored in the region causes the processing/communication load on the host to exceed a given threshold then the region is subdivided (follow the A steps below). If the deletion of an object leads to an empty region then the region is subsumed (follow the B steps below). If not, then the update operation is complete and stop here.

Step A4. Subdivision of a region requires dividing the region into four equal sized quadrants. Each of the objects in the region are assigned to the relevant quadrant that contains them. An object that overlaps multiple quadrants is broken into smaller objects. Step A5. The neighbouring regions for each of the four sub-regions are set using the neighbours of the region. The two left sub-regions have the same neighbours as the left neighbours of the region. The two top sub-regions have the same neighbours as the top neighbours of the region. The two right sub-regions have the same neighbours as the right neighbours of the region. The two bottom sub-regions have the same neighbours as the bottom neighbours of the region. The sub-regions are also neighbours of each other. See FIG. 4 for an example of neighbouring connections.

Step A6. The newly created regions are stored in the DHT using their "R(X,Y)" byte strings as keys. Step A7. The former region is not deleted. Rather it serves as a blank region. If a query from a lookup operation reaches a blank region then the responsible host informs the querying host that the region is blank and that the sub-regions should be contacted instead. Step A8. Subdivision is complete. Stop here.

Step B4. If a region is subsumed then the responsible host contacts the parent region and informs it of this. If all four regions of a parent region have been subsumed then the parent region no longer serves as a blank region. Step B5. Subsumed regions are not deleted. Rather they serve as a blank subsumed region. If a query from a lookup operation reaches a blank subsumed region then the querying host is informed that the parent region should be contacted. Step B6. Subsuming is complete. Stop here.

The leave operation is as follows. Step 1. The peer may leave the system by leaving the DHT. The DHT is responsible for maintaining the reliable storage of region information and so on. Step 2. If a querying peer, using its cached information, attempts to contact a responsible peer that has since left the system then the querying peer uses the DHT to locate the new responsible peer for the region in question.

It is noted that the algorithm is presented using a global region of fixed size. Providing for extensions to an unbounded size (within the constraints of the hardware arithmetic limits) will be evident to the skilled addressee. Similarly, extensions to higher dimensions, e.g. 3 and more, will be evident.

The algorithm is presented assuming each host uses only one IP address. The use of virtual IP addresses (which is sometimes applied for load balancing) will be a self evident extension to the algorithm to the skilled addressee. A host with multiple virtual IP addresses treats each independently as subsequent hosts for the purposes of the algorithm, e.g. each virtual address is independently joined. While assuming hosts join/leave one at a time, it would also be possible to include concurrent joining/leaving.

In this embodiment the distance from a point (or spatial object) to a region is computed using the Hausdorff distance. Cache compression techniques (e.g. collapsing neighbouring leaf nodes that are stored on the same host into a single cache entry) can be applied to reduce the cache complexity. Cache maintenance, e.g. deleting old entries and proactively caching new entries, may be applied to increase performance. In the described method cache entries are allowed to grow according to host bandwidth capacity allowance, thus minimizing lookup complexity for a given bandwidth capacity. This technique is known to approach O(1) lookup complexity.

A further variation of the described method caches, for a given leaf node, L, a number (possibly one) of randomly selected leaf nodes for each immediate child of each ancestor of L. In particular, in two dimensions, this includes the three neighbouring leaf nodes of L (which are children of L's immediate ancestor), at least one leaf node in each of the three trees rooted at the three children of L's second ancestor, and so on, up to the root of the tree. This variation achieves O(log n) lookup complexity. A recursive implementation may also be applied.

The interaction module of the present embodiment is responsible for ensuring that different players interact with each other efficiently. This involves making sure that the response time is very low. The response time for this operation will directly contribute to the quality of the gaming experience for the players.

In a MMOG there are different regions and each region could have thousands of players at any one time. Each player has a visible range of operation and within that range there could be a large number of players. This means that each player has to send update messages to all the other players in visible range so that the players are able to update the position of all the other players on their screen.

In a traditional client-server approach, each player sends one update packet to the server. The server then computes a new updated map for each player and sends it to them. This is repeated at a certain frequency (depending on the type of the game, it could vary from two to five times every second). As the players only need to communicate with the server, the upstream requirements for each player are not very high. The server however sends/receives updates to/from all the players. It therefore requires a very high bandwidth connection. The game publishers ensure that the servers are well connected with suitable network connections to handle peak conditions.

In the absence of a server in the decentralised approach of the present embodiment, the players have to interact with each other directly. If a particular user has a large number of other users in the visible range, that user must interact with all of them. This means sending update messages to all the visible players at a fixed frequency determined by the type of the game. This is an onerous task for most players. Most users are connected by access technologies such as ADSL and cable that have a limited upstream bandwidth. Sending update packets to all other visible players at a high frequency would require a throughput beyond most players.

The interaction module addresses the update problem by providing two components, a semantic filter and a broadcast controller. The two components together ensure that the players are able to communicate with all other relevant players without undue delay. The two components are described below.

The semantic filter screens the number of players with which a given player has to communicate. There could be a large number of players in a player's immediate vicinity. However, many of these players could be behind static objects and not visible to this player in the virtual environment. The semantic filter eliminates all the invisible players from consideration and computes a list of visible players in the area of interest.

The next step is to categorise the visible players into different levels. In order to understand the sorting process, it is important to understand a typical MMOG scenario. In a MMOG, there are several players in one area. Not all players are interacting with each other at the same time. A player typically interacts with one or two players (have a sword fight, sell items, etc) at any given time. Such players are categorised in the first level. The rest of the visible players are in the immediate vicinity of this player but do not need to be fully aware of the player's detailed actions. They are therefore categorised into various levels from 2 to n depending on several factors such as their distance from the player, the amount of detail required and other game based semantic information. For example, most players in the far background only need to know the position of the players that still exist in their visible range as they are too far to observe the player's detailed actions.

Each such level is then assigned an update packet size. The update packet is sent to all visible players to update the given player's position. Level one has the largest packet size because it consists of players that are closest to the given player and perhaps directly interacting with the player. They would require details of all the actions performed by the player. The rest of the levels from 2 to n are assigned packet sizes smaller than level 1 as the information detail required at each level is less than the previous level. The final level therefore has the smallest update packet size.

Each level is also assigned an update frequency, which in this embodiment is fixed for each level. The first level has the highest update frequency. This is because all the close-in players would need the updates more frequently. The rest of the levels are assigned a frequency in decreasing order. Hence the update frequency of level two is greater than the update frequency of level three and so on.

This process of semantic filtering ensures that the total upstream throughput required per node is reduced significantly. For example, if there were 100 visible players in a given area, a constant packet size of 100 bytes and a constant update frequency of 3 updates/sec, a total upstream throughput of 240 Kbps per player would be required. This is very high and most players will not be able to sustain such a high throughput. It could lead to packet drops and eventually dropped connections.

The semantic filtering process of the present embodiment can reduce the throughput requirements significantly. As an example, 5% of the players are in level 1, 10% in level 2 and the rest in level 3. Level 1 players have a packet size of 100 bytes, level 2 players have a packet size of 50 bytes and level 3 users have a packet size of 25 bytes. And, level 1 players have 3 updates/sec, level 2 players have an update frequency of 1 update/sec and level 3 users have a frequency of 0.5 updates/sec. In this example, the total upstream throughput required per node would be approximately 20 Kbps, illustrating that the semantic filter protocol provides a significant reduction from 240 Kbps.

The broadcast controller identifies an appropriate protocol to transfer the update packets to the relevant players at each level. Assuming that there are k levels identified by the semantic filter, each level i has:

Number of nodes: $n_i$
Update message size: $m_i$
Update frequency: $a_i$

Then, if the total available upstream bandwidth of the peer is U, $$U = \Sigma_{i=1}^{k} c_i \cdot \text{sqrt}(n_i) \cdot m_i \cdot a_i \quad (1)$$

Where $c_i$ is such that $0 \ll c_i < \text{sqrt}(n_i)$.

The value of $c_i$ decides the number of levels in the broadcast tree from the peer. For a given level, if the value of $c_i$ is $\text{sqrt}(n_i)$, then the broadcast tree has one level with all $n_i$ nodes getting the update directly from the peer. If $c_i$ is equal to 1 then the broadcast tree would have two levels. The choice of $c_i$ depends on several factors, the most important being U (upstream bandwidth). For each level, the highest possible value is selected for $c_i$ such that equation (1) is satisfied. When optimising equation (1), higher levels are given priority over lower levels. Therefore, $c_1 > c_2 > c_3 > \ldots > c_k$.

Once the values of the parameters are identified, a broadcast tree needs to be formed for each level i depending on the value of $c_i$. To identify the nodes that should be at the different levels of the broadcast tree, the system uses a range of parameters: upstream bandwidth of the nodes, stability history, network distance, ping-time statistics. Each parameter is assigned a weight based on its relative importance.

Using this approach, the present embodiment ensure that the updates are sent to all the nodes in an efficient manner. Nodes that have very low upstream bandwidth such as dial-up users can still join the MMOG network and interact with other players.

The security module of the present embodiment ensures that the game is secure enough and is protected from attacks from malicious users. The security module consists of two sub-modules—internal and external security. Internal security deals with attacks from users that are part of the online gaming system and external security deals with attacks from users that are not part of the gaming system.

Internal security is provided in recognition of the possibility that users that are part of the MMOG could try and manipulate the game state information, or modify messages to/from other gamers to achieve an unfair advantage. The present embodiment uses a modular security approach that uses a combination of several techniques to resist such illegal activity. The actual security module combination can depend on the type of information that is being secured and the level of security desired. Some of the techniques may require additional data processing that could increase the latency and therefore the effective response time. There is therefore a trade-off between the level of security to be included in the system and the final system performance. This choice would be a decision based on the game publisher's requirements for the game and the type of the game (strategy, role playing, first person shooter). The different techniques used are described in the following.

Using encryption techniques, the present embodiment ensures that the binary code generated and stored at each client machine is very hard to decrypt. This means that it would take a long time for a hacker to reverse engineer and break the code. Usually game updates occur perhaps once a week. Hence, if the encrypted binary code is replaced every week it would serve as a deterrent to most hackers that are trying to break into the system.

The messaging protocol can be modified constantly at a certain frequency (eg. every hour) to provide a morphed messaging protocol. For example, if the message size is 10 bytes with each byte representing certain game information, the sequence of the information can be modified and randomised every hour. A hacker would need some time to decipher the message packet and understand the different bits of information. By the time they have decoded the message, the information would be useless as the messaging protocol would have changed.

The present embodiment may further use authentication techniques to securely authenticate a user before they can join the game network. Similar techniques can be used to stop a malicious user from continued play of the game. Techniques involve broadcasting the malicious user's identity to all users and black-listing the user so that they cannot interact with any other user.

A bit slicing technique may further be applied to protect critical game state information from being accessed by malicious users. In this technique, the game state information packet is segmented into several smaller-sized packets. These sub-packets are stored at different nodes. In order to obtain the game state information, all these nodes have to be queried and all the sub-packets have to be obtained. This technique makes it harder for a malicious user to obtain critical game information as they have to hack into several nodes and not just one node. The sub-packets also get shuffled around different nodes periodically. This step ensures that even if a malicious user breaks into all the required nodes and obtains game information, it will be a matter of time before the information is obsolete.

Threshold cryptography adds another layer of security to protect confidential game state information. All confidential information is encrypted using public key encryption techniques. The additional step used in this approach is to split the key into n different sub-keys and distribute the sub-keys to n peers. In order to decrypt the message all the n sub-keys have to be combined to form the original key. This process ensures that it is extremely difficult for a malicious user to obtain the key in order to decrypt confidential game information.

Secure event agreement adds an additional layer of security to protect update messages from being tampered with. An update message is broadcast to a set of users along with a hashed value of the next update message (in reality it is the previous message and hashed value of the current message packet that is being broadcast). Given that the current/future message packet is hashed, all the other users are not able to use that information to gain unfair advantage. However, when they receive the next update packet, they receive the previous actual message packet. They can then hash this message and compare the value with the hashed value they received in the previous update. If the values don't match, the users can conclude that the outgoing message was tampered. A collective action can be taken to rectify the problem.

The system further allows the use of trusted peers that can act as security agents in the game network. These peers would be typically owned by the game publisher and therefore can be trusted with their actions. These peers would be able to monitor game traffic and perform checks in order to ensure that the game data is reliable and authentic. They would have the power to prohibit users from joining the game network if they breach game rules.

An external security component targets attacks that originate outside the system such as denial of service (DoS) attacks, virus attacks, computer hackers who are not users of the online game. The present architecture is inherently resistant to DoS attacks as there are no central game servers involved, and there is no single machine that hackers can target for a DoS attack. If hackers DoS a particular node, only that user is affected. For the rest of external attacks, standard techniques can be used at the nodes such as maintaining virus protection software and not opening ports for unusual programs.

It is further noted that the decentralised architecture of the present embodiment has inherent fault tolerance built into the system as there is no single point of failure. There is not a single machine to target for a denial of service (DoS) attack, that can interrupt the entire game. Targeting a particular user for a DoS attack only stops that user from accessing the game network. The rest of the players are minimally affected and they can continue to play the game without interruptions.

Further, as there are no central servers involved, there is no maintenance down time required for the game.

To provide additional protection in the event of a mass exodus, the system relies on trusted peers. Trusted peers are nodes controlled by the publisher that have additional capabilities. These nodes backup game state information at a regular frequency. In the unlikely event of a mass exodus (for example, more than 90% players disconnecting from the game network in a very short timeframe), trusted peers can roll-back the game to the most recent state that was saved. This ensures that the remaining players can continue playing the game without interruptions and rejoining players can rejoin the game at a later time to continue the game from where they left.

A peer-to-peer overlay is the underlying protocol that distributes the objects across various peers using techniques such as distributed hash tables (DHT). The present embodiment of the invention utilises OpenDHT which is a peer-to-peer overlay that is widely available under the open source licensing agreement.

In alternative embodiments of the invention, a further security strategy may be employed with particular relevance to DoS. A peer to peer system is vulnerable to a DoS attack upon individuals as the internet protocol (IP) address of the peers is included in the IP header, which cannot be encrypted. This is a concern in a multi-user gaming environment when a peer is interacting with another peer. A malicious peer can DoS the peer he/she is interacting with in the virtual space to gain unfair advantage.

The further security strategy of the present invention has been designed, and takes the form of a randomisation protocol that makes its more difficult for potential attackers to discover the IP address of a given player in the virtual space. Assume that a peer X needs to interact with n other peers: p1, p2, p3, . . . pn. A table that contains a list of peers is stored at each client. The list includes all the peers that peer X needs to interact with, and send updates periodically (p1, p2, . . . pn) and another set of k peers that are in close proximity to the peer X based on network/geographic distance (j1, j2, j3, . . . , jk).

We define a weight function which is a function of several parameters: network distance, ping time, upstream capacity, current load, stability history). W=f (network distance, ping stats, upstream capacity, current load, stability history). For each peer i in the table, their weight Wi is computed using the above function and the value is stored in the table. Every time peer X has to send an update to the n peers, it selects C*qrt(n) peers from the table, where C is a tunable constant. Each peer i has a fixed probability of being selected. The probability is computed as follows:

$$Pi = \frac{Wi}{\sum_{j=1}^{n} Wj}$$

Using these probability values, a sub-set of peers (level one peers) are selected and the update packet is sent to them directly. The level one peers are also instructed to forward the update packet to a set of other random peers (level two peers). The selection of peers for each candidate position in the tree is done by randomly choosing a peer from the list according to the probability values, the chosen peer not being available for subsequent selections. This process is repeated until all the peers (p1, p2, . . . , pn) have been selected and included in the random tree. The update packet therefore has a set of IP addresses of certain peers included along with the data. The list of IP addresses is encrypted in the data packet, so that it is not easy to decipher them. This ensures that when a client receives or sends an update, they do not know their position in the tree.

As the list of primary peers and secondary peers varies for every single update, the interacting peer X would not be able to match the IP address that is included in the IP header of the update packet to the identity of a peer in the virtual space. The task of identifying the IP address of a peer is further complicated because the update packet is identical for all the peers. When a level one peer forwards the update packet to a level two peer (who does not have to forward the update packet to anyone), the update packet includes dummy/null IP addresses encrypted in the data packet. This ensures that the update packets are always identical at every stage of the update process.

This procedure also discourages the interacting peers to DoS a random IP address. This is because the targeted IP address could belong to a computer that is a level one peer responsible for forwarding the attacker's update packets. Attacking that computer would prevent the malicious peer from gaining unfair advantage as its updates won't reach the interacting peer.

The randomisation protocol can include a number of parameters in the weight function that are tuned to distribute the load across the peers and thereby facilitate load balancing.

The present embodiments thus provide a platform which is decentralised, and in which centralised game servers are not required to host the game. The game state information and the data processing is delegated to all the users that are playing the game. The data is distributed in such a way so that the load is balanced efficiently. The architecture utilises a peer-to-peer overlay for this purpose.

Providing a peer-to-peer overlay network for real-time applications such as massively multi-player online games, that involve large number of users spread across the interne and on different networks, requires many issues to be resolved. State update messages broadcast by a player must reach all the other players in the visible range. Game state information, which is critical for an MMOG, is distributed across all the players. The underlying network topology is often not known, and users are connected to the network in a variety of ways such as by dial-up, broadband and FTTH connections. These differences could lead to state information that is unreliable. If a player suddenly leaves the peer-to-peer network, critical game state information should not be lost.

In a peer-to-peer distributed application, all application data is stored by the end users themselves. For an MMOG to be deployed on the interne, it must be robust enough to discourage attacks from malicious users that are trying to misuse the system. Performance of MMOGs depends heavily on the underlying network. Peer-to-peer technology relies on the peers for message routing. This can affect the efficiency of the MMOGs as the behaviour of the peers is unpredictable. Inefficient systems can lead to increased latency which can be unsatisfactory for time critical applications such as online network gaming.

Bearing these challenges in mind, the present MMOG architecture has been developed to provide a novel development platform for game developers to develop massively multi-player online games. The present invention comprises several modules to address these challenges and provide a cost effective and efficient method to deploy MMOGs, which delegates data processing to individual participants and can thus reduce or avoid the cost of maintaining expensive central game servers. It also reduces the game traffic in the core network thereby reducing network bandwidth costs. It also improves the fault tolerance by removing the central point of failure. The platform is easy to implement and deploy as it provides a set of APIs that can be used by game developers to build their game. Using this protocol, game developers do not have to worry about the underlying network protocols and also the message routing between different users.

The present embodiment thus provides a generic platform that can be optimised for any MMOG, and which provides the technology for the networking protocols to handle routing and messaging, so that game developers do not have to expend effort upon communications aspects of the game and can focus on content development.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. In a peer-to-peer real time network in which network state information and data processing is delegated to user nodes, a non-transitory machine-readable medium that contains broadcast control protocol instructions for optimizing packet transfer between a first node and a plurality of related nodes which when executed by a processor cause the processor to perform operations, comprising:
   assigning to each related node a relevance level i being selected from k relevance levels, indicating the relevance of that related node to the first node;
   associating with each relevance level i a number of nodes $n_i$, an update message size $m_i$ and an update frequency $\alpha_i$; and
   determining from an available upstream bandwidth U of the first node a number of levels $c_i$ in a broadcast tree of the first node by reference to $U=\Sigma_{i=1}^{k} ci \cdot sqrt(ni) \cdot mi \cdot \alpha$, wherein $0<c_i<sqrt(n_i)$.

2. The broadcast control protocol of claim 1 wherein the highest satisfying value of $c_i$ is selected.

3. The broadcast control protocol of claim 1 wherein higher levels of the broadcast tree are given priority over lower levels such that $c_i>c_2>c_3 \ldots >c_n$.

4. The broadcast control protocol of claim 1 wherein the broadcast tree is formed by allocating each related node to a level of the broadcast tree based on at least one of the parameters of: upstream bandwidth of the related node, stability history, network distance and ping time statistics.

5. A system comprised of multiple nodes operating in accordance with the protocol instructions of claim 1.

6. A user software application for implementing the protocol instructions of claim 1.

7. A game development platform software application for enabling game developers to design games or online environments by complying with the protocol instructions of claim 1.

8. A device configured to operate in accordance with the protocol instructions of claim 1.

* * * * *